July 6, 1948.  C. MELIDONI  2,444,743
CABLE ADJUSTER
Filed Sept. 10, 1946
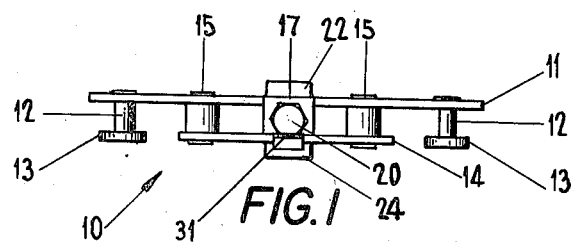
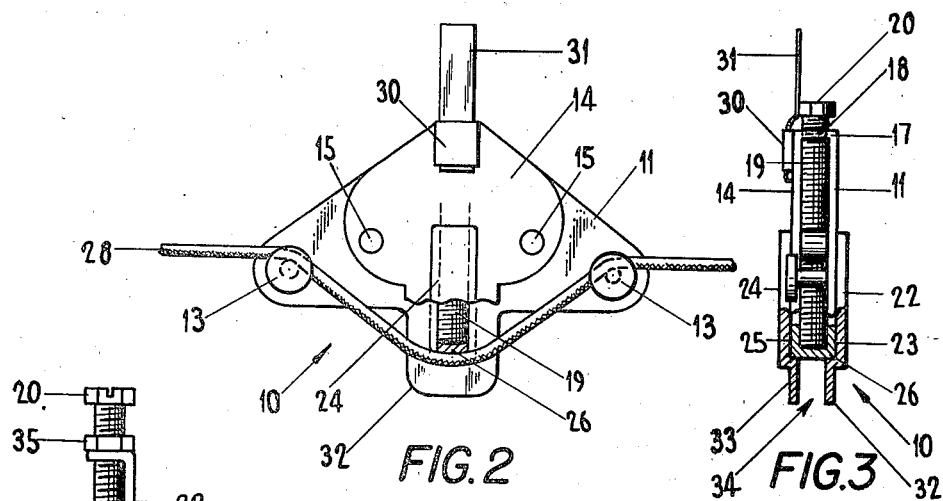
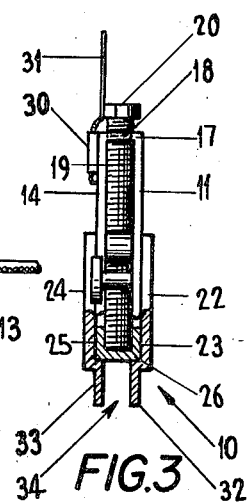
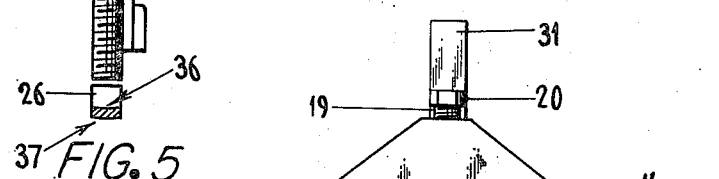
CONSTANTINE MELIDONI
INVENTOR.
BY Joseph Blacker
ATTORNEY Patented July 6, 1948

2,444,743

UNITED STATES PATENT OFFICE 2,444,743

CABLE ADJUSTER

Constantine Melidoni, Fort Lee, N. J.

Application September 10, 1946, Serial No. 695,892

4 Claims. (Cl. 24—71.1)

This invention relates to a cable take-up device which will tighten a cable in position without disconnecting the connected ends of the cable.

An object of this invention is to provide a cable take-up device having means for engaging a cable intermediate its connected ends and whereby a tightening operation may be carried out on the cable without the need of special tools.

Another object of this invention is to provide a take-up device having spring means in contacting relation with a threadable adjusting member whereby when adjustment has been made, the spring will automatically lock the threadable member in set position and maintain the adjustment.

Another object of this invention is to provide a cable adjuster which can be made of stamped sheet metal whereby the device may be produced at a low cost so as to be available to the vast majority of users of such devices.

Another object of this invention is to provide a cable adjuster having a cable contacting member slidable between two alined upright guideways which terminate at predetermined levels to prevent the cable contacting member from becoming disengaged from the guideways.

It is to be noted that the importance of the two alined upright guideways lies in the fact that they prevent the cable contacting member from moving out of vertical alinement. It is also to be noted that the cable contacting member has a concave wall into which the bolt enters and is also restrained from moving out of alinement with the guideways. This reinforces the bolt against sideways wedging under load.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 1 is a top plan view of the device.

Figure 2 is a front elevation, partly broken away to show the operating mechanism.

Figure 3 is an end elevation.

Figure 4 is a rear elevation of the device.

Figure 5 is a plan view of a modified bolt lock.

In the illustrated embodiment of the invention, the numeral 10 indicates a cable take-up device comprising a plate body member 11. The member 11 has two headed pins 12 fixedly secured at opposite ends thereof, the heads 13 extending in spaced-apart relation from the plate body member 11.

The take-up device 10 comprises a complementary plate member 14 which is of smaller dimensions than the plate body member 11. Shoulder pins 15 pass through the plate members 11 and 14 and secure the plates in spaced-apart assembled relation.

As best shown in Figures 1 and 3, the plate body member 11 has a right angular extension 17 having a threaded aperture 18. Threadably mounted in the aperture 18 is a bolt 19 at one end of which is a head 20 which is preferably formed hexagonal.

The plate body member 11 has a rib 22 extending outwardly therefrom and providing a guideway 23. The plate member 14 has a rib 24 extending outwardly therefrom and providing a guideway 25. The guideways 23 and 25 are in alinement in vertical planes.

Slidably mounted in the guideways 23 and 25 in the plate members 11 and 14 is a cable contacting member 26. The free end of the bolt is under operating conditions in engagement with the slidable member 26. It will thus be seen that the bolt may be rotated to move the slidable member 26 down within the limits of the lengths of the guideways 23 and 25.

As best shown in Figure 2 it will be seen that a cable 28 may be passed over the right hand headed pin 13 and under the slidable member 26 and then over the left hand headed pin 13 and that upon rotating the bolt 19 the slidable member 26 may be moved downwardly and cause a tightening up of the cable 28.

The plate member 14 has an ear 30 extruded therefrom. A strip of thin spring steel 31 is secured in the ear 30 and has its upper portion bent toward the hexagonal head 20 of the bolt 19. The leaf spring 31 is positioned so as to come into resilient engagement with one of the sides of the hexagonal head and automatically lock the bolt in set position after an adjustment has been made.

It is to be noted that the plate members 11 and 14 have lower extensions 32, 33, which form between them a cable guideway 34. The guideway 34 prevents disengagement of a slack cable from the device.

Figure 5 shows a modified bolt lock wherein the bolt 19 has a lock nut 35 which serves in a manner like the spring 31 for locking the bolt after its position has been set.

It is to be noted that the bottom of the bolt is in contact with the concave upper surface 36 of the cable contacting member 26 whereby the bolt is centered during operating conditions. Also that the lower surface 37 of the member 26 is convex and in direct contact with the cable 28 and this prevents damage to the cable.

It is also to be noted that while I have shown headed pins 12 for engaging the cable, that I may form cable-engaging hooks by bending the end portions of the body member 11 upwardly in the same locations as the pins 12. The hooks will provide a less expensive method of engaging the cable.

In accordance with the patent statutes I have described and illustrated the preferred embodiment of my invention, but it will be understood that various changes and modifications can be made therein without departing from the spirit of the invention as defined by the appended claims.

I claim:

1. In a cable take-up device, comprising a plate body member having two headed pins with the headed ends in spaced-apart relation from said plate body member, a complementary plate member, means for securing said plate members in spaced-apart relation from each other, said plate body member comprising a portion bent in right-angular relation thereto, said bent portion having a threaded aperture, a bolt threadably mounted in said aperture, said plate members having ribs extending outwardly therefrom and forming guideways, a cable contacting member slidably mounted in said guideways, said complementary plate member having a spring extending therefrom in alinement with the head of said bolt, whereby when said bolt is threaded to cause movement of said slidable member, said bolt will be automatically retained in locked position by said spring.

2. In a cable take-up device, comprising a stamped sheet metal plate body member having two headed pins with the headed ends in spaced-apart relation from said plate body member, a complementary stamped sheet metal member, means for securing said members in spaced-apart relation from each other, said body member comprising a portion bent in right-angular relation thereto, said bent portion having a threaded aperture, a bolt threadably mounted in said aperture, said members having ribs extending outwardly therefrom and forming upright and alined guideways, a U-shaped cable contacting member slidably mounted in said guideways, said complementary member having a spring extending therefrom in alinement with the head of said bolt, whereby when said bolt is threaded to cause movement of said slidable member, said bolt will be automatically retained in locked position by said spring.

3. In a cable adjuster, comprising a stamped sheet metal body member having two cable engaging members, a complementary stamped sheet metal member, means for securing said members in spaced-apart relation from each other, said body member comprising a portion in right-angular relation thereto, said portion having a threaded aperture, a bolt threadably mounted in said aperture, said members having ribs extending outwardly therefrom and forming upright and alined guideways, a U-shaped cable contacting member slidably mounted in said guideways, the bottom wall of said cable contacting member having a concave upper surface for centering said bolt and a convex lower surface in direct contact with said cable, and locking means engaging said bolt.

4. In a cable adjuster, comprising a sheet metal body member having two cable engaging members, a complementary sheet metal member, means for securing said members in spaced-apart relation from each other, said body member comprising a portion in right-angular relation thereto, said portion having a threaded aperture, a bolt threadably mounted in said aperture, said members having ribs extending outwardly therefrom and forming upright guideways, a cable contacting member slidably mounted in said guideways, the bottom wall of said cable contacting member having a concave upper surface for centering said bolt and a convex lower surface in direct contact with said cable, said plates having extensions forming a guideway for said cable to prevent disengagement of a slack cable from said cable adjuster.

CONSTANTINE MELIDONI.